United States Patent [19]

Wilson

[11] Patent Number: 5,002,084
[45] Date of Patent: Mar. 26, 1991

[54] QUICK CLEAN ROTARY VALVE

[75] Inventor: Larry J. Wilson, Muncy, Pa.

[73] Assignee: ABB Sprout-Bauer, Inc., Muncy, Pa.

[21] Appl. No.: 508,792

[22] Filed: Apr. 12, 1990

[51] Int. Cl.⁵ ............... G01F 11/24; F16K 43/00; F16K 51/00

[52] U.S. Cl. ............... 137/15; 137/315; 222/368; 406/62; 406/65; 414/219

[58] Field of Search ............... 137/15, 315, 238; 222/148, 368; 406/62, 63, 65, 66, 68; 414/219

[56] References Cited

U.S. PATENT DOCUMENTS

| | | | |
|---|---|---|---|
| 2,816,693 | 12/1957 | Greaves et al. | 222/368 |
| 3,273,758 | 9/1966 | Starrett | 222/368 |
| 4,059,205 | 11/1977 | Heyl | 222/368 |
| 4,076,150 | 2/1978 | Didrickson | 406/65 |
| 4,238,058 | 12/1980 | Heth | 222/368 |
| 4,372,338 | 2/1983 | Efferson | 222/368 |
| 4,565,305 | 1/1986 | Fischer et al. | 222/368 |
| 4,600,032 | 7/1986 | Heyl | 137/315 |
| 4,602,727 | 7/1986 | Jackson | 222/368 |
| 4,784,298 | 11/1988 | Heep et al. | 222/368 |
| 4,830,043 | 5/1989 | Heyl | 137/315 |

Primary Examiner—George L. Walton
Attorney, Agent, or Firm—Chilton, Alix & Van Kirk

[57] ABSTRACT

A rotary valve and associated method of cleaning, including a generally cylindrical housing (104) defining a central axis, and a rotatable shaft (106) mounted in a first end plate (130) of the housing for rotation by a drive system (108) operating adjacent the first end plate. A vane rotor (102) is connectable to the shaft in an operating position entirely within the housing for transmitting the rotation of the shaft about the axis to the vanes (140) of the rotor. The rotor is selectively axially displaceable relative to the shaft, into a cleaning position entirely outside the housing. This is facilitated by the mounting of the rotor to the other, second end plate (110), such that the disassembly of the second end plate from the housing and the axial displacement thereof away from the first end plate, also displaces the rotor. Thus, the shaft is never disengaged from the drive system and, therefore, the longitudinal and radial positions of the shaft relative to the axis, are not disturbed during disassembly and reassembly.

13 Claims, 3 Drawing Sheets

QUICK CLEAN ROTARY VALVE

BACKGROUND OF THE INVENTION

The present invention relates to rotary valves of the type which may be disassembled by the user for easy cleaning.

Rotary vane valves are commonly used as air lock devices for transferring particulate solids between two regions or systems having different pressures. Typical rotary vane valves consist of a closed cylindrical housing with material inlet and outlet openings through the housing lateral wall, and an externally driven rotor unit within the housing, having a number of pockets for transferring the material from the inlet to the outlet.

Such valves have been used in the food and pharmaceutical industries, where the maintenance of sanitary conditions is necessary. Such units are typically chrome or highly polished stainless steel, which can be disassembled for cleaning, i.e., to maintain hygienic conditions and to prevent contamination by the inadvertent mixing of materials from different batch processing operations. In these industries, the units are also typically designed for low pressure and light service, so that disassembly can be quickly accomplished without the use of hand tools.

Recently other industries, such as the plastic industry, has found the need for a rotary valve similar to the type used in the food and pharmaceutical industries, but capable of higher pressure, abrasion resistance, and the handling of larger volumes of feed material. The plastics industry is increasing requiring quick and easy disassembly as well, in part due to their customers' requirements for shorter production runs. Shorter runs means that the major material handling systems must be thoroughly cleaned on a daily or weekly basis. Even if one plastic pellet is missed during such cleaning, the subsequent run is affected by, for example, color streaking in bottles or the like, and excessive scrap relative to the total volume of the production run.

U.S. Pat. No. 4,565,305 illustrates a known type of rotary vane valve. FIG. 1 herein is an exploded view of another known rotary vane valve, showing that the typical construction has the rotor and shaft rigidly connected together as a functional unit. Known improvements to these basic designs, for the purpose of promoting the quick disassembling and cleaning of the rotor, have focused on facilitating the removal of the rotor unit without the need for heavy tools and the like. Nevertheless, although disassembly and cleaning have been facilitated, the reassembly of the complete rotary vane valve has been time-consuming, particularly with respect to the reattachment and alignment of the shaft with the motorized or similar drive device associated with the valve.

Reassembly requires care because rotary vane valves of this type have close axial and radial tolerances in order that the clearance between the vanes and the housing wall can be kept within prescribed limits. Differential thermal expansion affects, the pressure differential across the valve, and particulate size and hardness, all dictate that the vane clearance range be maintained after disassembly and reassembly. Moreover, disassembly and correctly aligned reassembly should be readily accomplished by the user of the valve, thereby avoiding down time associated with calling in a mechanic or equipment maintenance man.

SUMMARY OF THE INVENTION

It is thus an object of the present invention to provide a rotary vane valve which not only can be readily disassembled, but which can be easily reassembled without the need to carefully reset and check parts which are to be held to a tight tolerance.

It is a further object of the invention that such ready disassembly and reassembly be achievable in relatively larger, heavier sized rotary vane valves of the type used in the plastics industry.

This object is accomplished by a rotary valve having a generally cylindrical housing defining a central axis, and a rotatable shaft mounted in a first end plate of the housing for rotation by a drive system operating adjacent the first end plate. A vane rotor is connectable to the shaft in an operating position entirely within the housing for transmitting the rotation of the shaft about the axis to the vanes of the rotor. The rotor is selectively axially displaceable relative to the shaft, into a cleaning position entirely outside the housing. This is facilitated by the mounting of the rotor to the other, second end plate, such that the disassembly of the second end plate from the housing and the axial displacement thereof away from the first end plate, also displaces the rotor. Thus, the shaft is never disengaged from the drive system and, therefore, the longitudinal and radial positions of the shaft relative to the axis, are not disturbed during disassembly and reassembly.

The rotor preferably includes a hub member having a tubular sleeve substantially axially coextensive with the vanes, for telescopingly receiving the shaft, and a coaxial extension member for mounting within, and rotation relative to, the second end plate. The rotor separates from the drive shaft at a taper ring at one axial end and a bushing at the other axial end, both of which provide close tolerance radial location while the taper ring also provides axial location. A key inside the sleeve of the rotor hub engages a longitudinal groove on the shaft and provides positive transmission of rotational force. An axially operable clamp urges the rotor hub against the shaft within the housing to maintain the closed position.

In a further embodiment of the invention that is particularly adapted for use with valves having a heavier rotor, the detachable, second end plate and rotor are mounted on an adapter plate that slides longitudinally in parallel with the axis. The adapter plate has a stationary portion connected to the housing, so that as the slider moves axially relative to the fixed portion, the disengaged rotor can be withdrawn substantially axially out of the housing. The rotor is cleaned while it is still in axial alignment with the housing. The rotor and associated detachable plate are, upon completion of the cleaning, pushed axially toward the shaft, while the adapter plate maintains the substantial axial alignment thereof.

BRIEF DESCRIPTION OF THE DRAWINGS

These and other objects and advantages of the invention will be described below with reference to the accompanying drawings, in which.

DESCRIPTION OF THE PREFERRED EMBODIMENT

Figure 1:
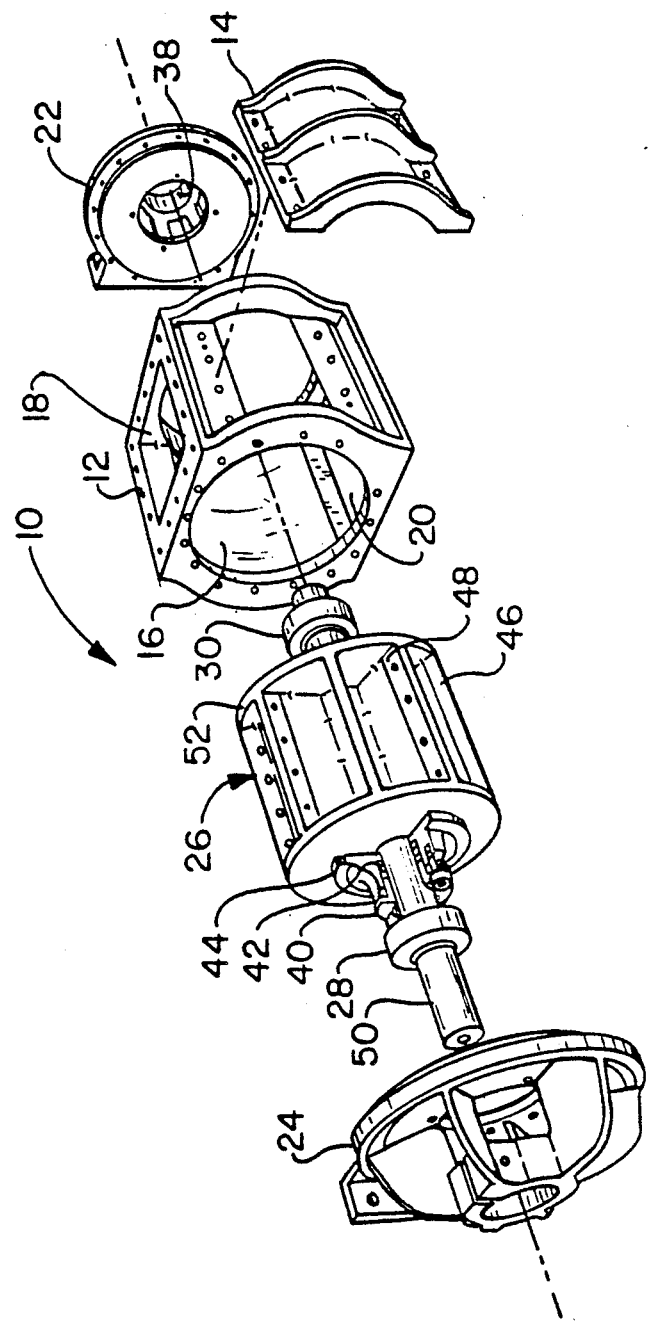
FIG. 1 is an exploded view of a prior art rotary valve.

FIG. 1 shows a known rotary vane valve 10 in exploded view including a valve housing or casing 12,14, which defines a cylindrical chamber 16 having an inlet opening 18 and an outlet opening 20 intersecting laterally thereto, and first and second axially opposed end plates 22,24. A rotor unit 26 is mountable in bearing cartridge 28,30 which fit recesses 38 in the end plates, and may include packing glands 40, and packing rings 42 within the packing housing 44 on either side thereof. The rotor unit 26 includes a plurality of radially extending vanes 46, which in some embodiments include replaceable or adjustable tips 48 axially coextensive with the vanes.

The shaft 50 is fixed to the rotor 52 and thus forms part of the rotor unit 26. Typically, one end of the shaft 50 is longer than the other and is connectable to a drive system such as a motor or related gear or pulley system, adjacent one of the end plates.

To the extent known attempts have been made to facilitate the quick disassembly and cleaning of the rotor unit 26, the shaft 50 has remained with the rotor 52 when the rotor has been removed from the housing. This necessitates careful axial and radial realignment of the rotor unit 26 to assure proper clearances relative to the wall of chamber 16.

Figure 2:
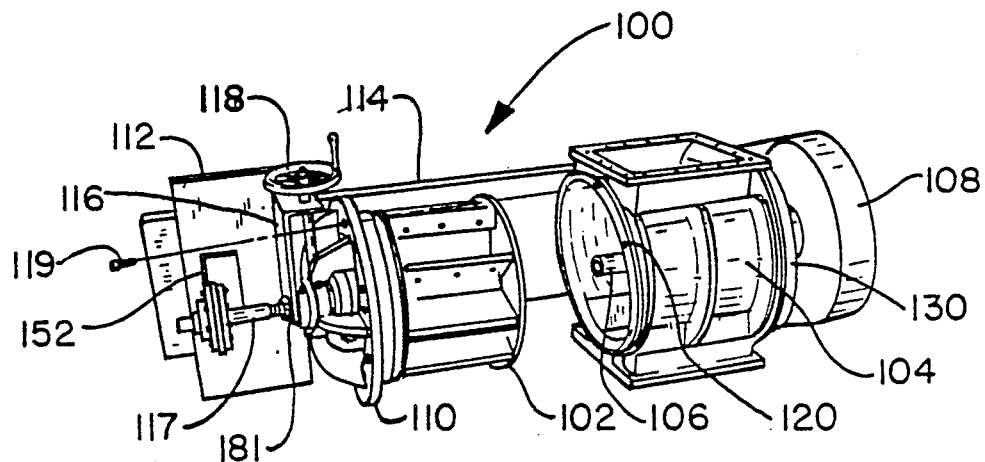
FIG. 2 is a perspective view of the rotary valve in accordance with the invention, in the open position for cleaning of the vanes.
Figure 4:
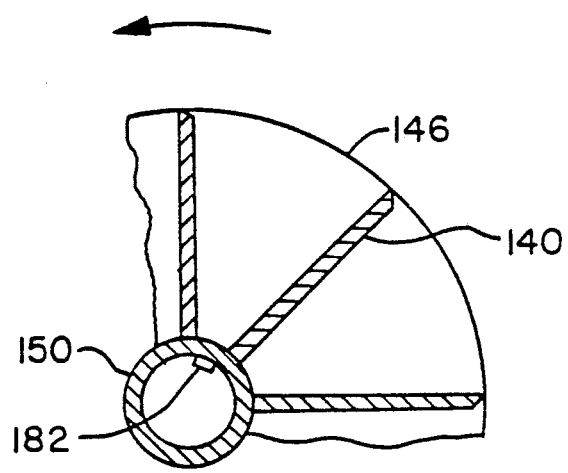
FIG. 4 is a section view taken through line 4-4 of FIG. 3.
Figure 3:
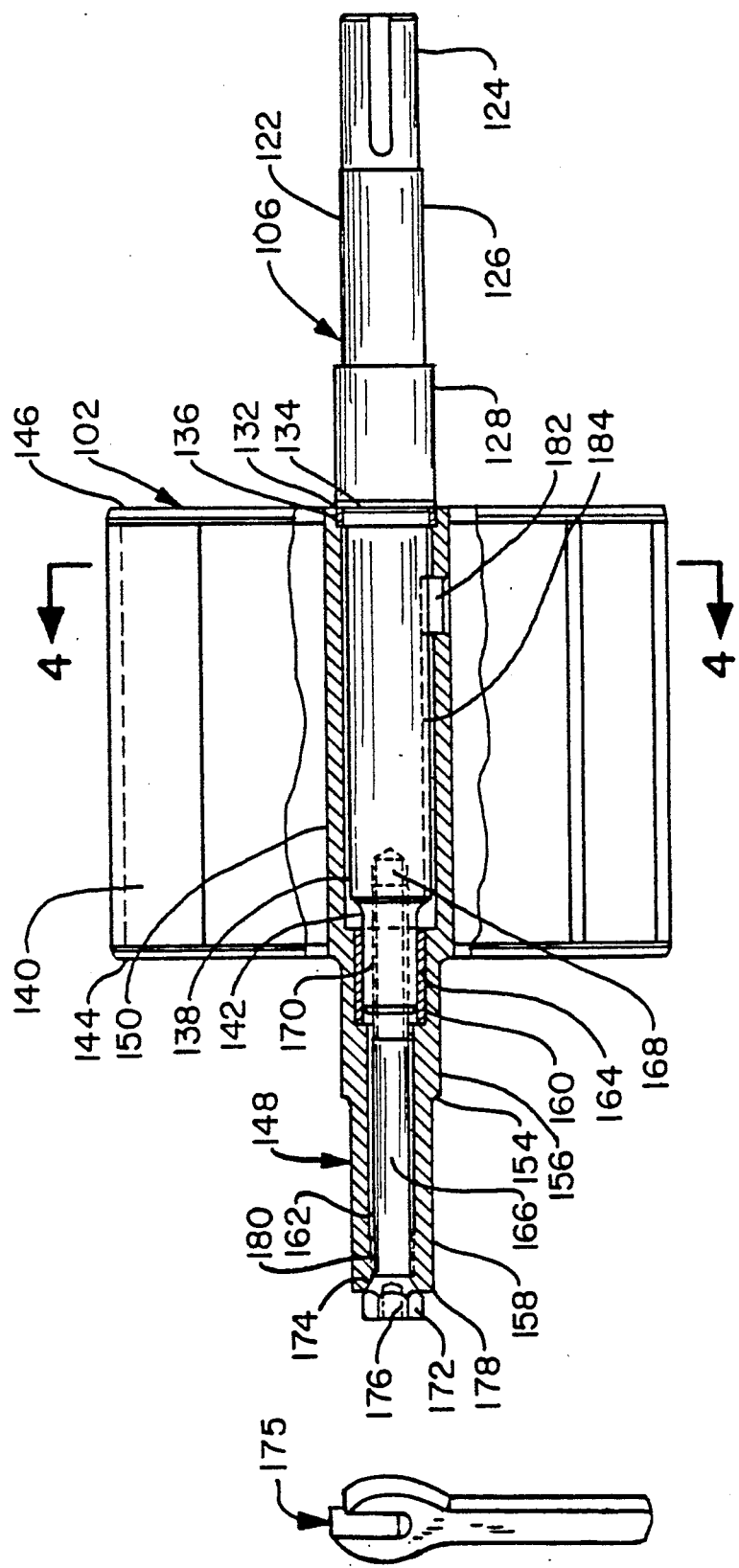
FIG. 3 is a longitudinal view, partly in section, of the drive shaft in engagement with the rotor in accordance with the present invention.

In contrast, the inventive rotary valve 100 shown in FIGS. 2-4, permits the removal of the rotor 102 from the housing 104 without disturbing the shaft 106, which not only remains in the housing, but is not disconnected from the drive system 108.

Because in the more demanding applications, the rotor 102 and disengagable end plate 110 may weigh up to 200 pounds, the removal thereof from the housing 104 can be facilitated by supporting the end plate 110 on an adapter plate 112 mounted for sliding relation to the stationary plate 114 that is connected to the housing 104. In this manner, the rotor 102 and shaft 106 are maintained substantially axially aligned during disengagement, disassembly, cleaning and reassembly.

The movable adapter plate 112 is mounted during disassembly and assembly by means of a first mounting bracket 116 connected to the end plate 110, rotor 102, or extension bolt 117. An adjustment device 118 oriented transversely to the axis, is also connected between the movable adapter plate 112 and the end plate 110. This combination of bracket 116 and adjustment device 118, provides a lever or joint action that permits slight adjustment of the rotor axis relative to the shaft axis as the movable portion 112 of the adapter plate is translated to the right in FIG. 2, whereby the shaft and rotor can be reassembled into the closed, operating position. Once the shaft 106 and rotor 102 have been properly connected together, the bolts or handwheels 119 at, for example four locations, are secured to the end plate 110 and the rim 120 of housing 104.

FIGS. 3 and 4 show the preferred way in which the shaft 106 and rotor 102 are connected in accordance with the invention. It should be appreciated that FIG. 3 is illustrative only, for the purpose of showing this connection. The shaft 106 would normally be substantially permanently connected to the drive means 108 and all parts thereof would remain in the housing 104. The shaft typically consists of a shank portion 122 having several different outer diameters 124,126,128 for accommodating the drive mechanism 108, end plate 130, and associated bearings (not shown). At a preselected axial location 132 on the shaft 106, a first shoulder 134 is provided for positioning a taper ring 136. The shaft stem portion 138 extends from the shank 122 an axial distance greater than the axial extent of the rotor vanes 140, and terminates in a nose portion 142 of reduced diameter with internal threads.

The rotor 102 has a central hub member 148 and a plurality of radially extending vanes 140, which are contained within side walls 144,146. The vanes 140 project rigidly from a substantially tubular sleeve portion 150 of the hub member 148. The sleeve portion 150 has, within the axial extent of the vanes, an inside diameter greater than the outside diameter of the stem portion 138 of the shaft, which is telescopingly received therein. The hub member 148 also has a shank portion 154 which has a series of outer diameters 156,158 substantially equivalent to the outer diameters 128,126 of the shank portion of the shaft. Preferably, the hub shank 154 is hollow and has at least two inner diameters 160,162. The larger inner diameter 160 receives a bushing 164 which in turn receives the nose portion 142 of the shaft. This bushing radially aligns the hub member 148 relative to the shaft 106. The other inner diameter 162 of the hub shank receives a clamping bolt 166 having an externally threaded lead end 168 which engages the internal threads 170 on the nose 142 of the shaft. The clamping bolt 166 includes a head 172 having a threaded bore 176 and external shoulders 174 which bear upon the free end 178 of the hub shank 154.

As the bolt is torqued while the shoulders 174 engage the free end 178, as by open end or other hand wrench 175, the hub member 148 and shaft 106 are drawn toward each other until the taper ring 136 is fully seated. In practice, the shaft 106 does not move axially but rather the hub sleeve 150 is drawn over the shaft until it is fully seated. The taper ring 136 provides both axial and radial positioning of the hub 148 onto the shaft 106. With the bearing 164 providing radial alignment, the rotor 102 is thus automatically properly aligned by the clamping bolt 166.

To remove the rotor for cleaning, the four handwheels 119 are removed and bolt 166 is removed using wrench 175. In smaller valve sizes where the weight is insignificant, the rotor 102 and end plate 110 can be removed by hand. In larger valves where weight can be considerable, adapter plate 112 is moved into location, extension bolt 117 is advanced via the wrench 175 on profile 181 into engagement with threads 180 on the free end 178 of the hub 148. Handwheel 118 with its associated thread is engaged with a tapped bore (not shown) in the end plate 110. With extension bolt 117 stabilizing the rotor 102 and handwheel 118 lifting the rotor clear of the bore, the rotor and end plate can be retracted from the valve housing. The other end of the extension bolt 116 is supported within the bracket 152.

In a service environment which does not require the use of a heavy end plate 110 and associated rotor 102, the adapter plate 112,114 could be dispensed with, and the tightening of the clamping bolt or its equivalent, can be accomplished by an end wheel (not shown).

FIG. 4 shows that in the preferred embodiment, the sleeve portion 150 of the hub includes a key 182 projecting radially inward from the otherwise circular inner diameter. The key 182 is adapted to fit in a longitudinal groove 184 in the exterior of the stem portion 138 of the shaft. The key 182 insures a rigid transfer of the rotational movement of the shaft 106, to the hub 148 and thus to the vanes. Preferably, the key 182 and groove 184 are not depended upon for the axial and radial alignment of the rotor relative to the shaft, but only for the transmission of rotational force from the shaft to the vanes.

It should be appreciated that other particular implementations of the present invention fall within the scope of the appended claims, and accordingly, the scope thereof should not be unnecessarily limited by the details associated with the preferred embodiment.

I claim

1. A rotary valve comprising:
   a housing having a generally cylindrical valve chamber defining a central axis, and inlet and outlet openings for material flow into and out of the chamber in a direction generally transverse to the axis, and the chamber having first and second axially opposed open ends;
   a first end plate for closing the first end of the chamber;
   a second end plate secureable to the second end of the chamber for selectively closing and opening said second open end;
   a rotatable shaft passing axially through the chamber, the shaft having a first end mounted in the first end plate and a second end adjacent the second end of the chamber;
   drive means connected to the first end of the shaft, for imparting rotation thereto;
   a vane rotor including coupling means engaging the shaft within the chamber, for positioning the rotor axially relative to the shaft when the rotor is in an operating position entirely within the chamber, and for transmitting the rotation of the shaft about said axis to the vanes in said operating position, said coupling means being selectively disengageable from the shaft when the shaft is stationary, whereby the rotor can be displaced axially away from the shaft and through the open second end of the housing to a cleaning position wherein the rotor is entirely outside the housing while the shaft first end remains connected to the drive means; and
   means for mounting the rotor to the second end plate at least while the rotor is in said operating position.

2. The rotary valve of claim 1, wherein the rotor is connected to the second end plate and displaceable therewith between the operating and cleaning positions.

3. The rotary valve of claim 1, wherein said coupling means are supported by a hub member which forms part of and extends axially through the rotor and has one end mounted in the second end plate by said means for mounting.

4. The rotary valve of claim 3, wherein the hub member includes a tubular sleeve portion substantially axially coextensive with the vanes, for telescopically receiving the shaft, and a coaxial shank portion defining said one end mounted in said second end plate.

5. The rotary valve of claim 1, wherein said rotor includes a central hub member having a tubular sleeve with an open end facing the first end plate;
   said shaft includes a shank portion engaging the drive means and mounted in said first end plate, and a stem portion extending from the shank portion and having a free end, the stem portion telescopingly fitting within said rotor sleeve,
   coupling means includes means extending radially between the sleeve and the stem portion for transmitting the shaft rotation to the vanes, means situated at the open end of the sleeve for axially and radially aligning the sleeve relative to the stem portion, and means situated at the free end of the stem portion for radially aligning the sleeve relative to the stem.

6. The rotary valve of claim 5, wherein,
   the shaft stem portion includes a nose portion defining said free end,
   said hub member includes a hollow shank portion extending from the sleeve and mounted in said second end plate, and
   manually operated clamp means pass axially through the hub member shank into engagement with the nose portion of the shaft, for drawing the sleeve and shank of the shaft axially toward each other.

7. The rotary valve of claim 6, wherein,
   said means situated at the open end of the sleeve is a taper ring,
   said means situated at the free end of the stem portion is a bearing which receives the shaft nose portion, and
   said means for transmitting shaft rotation include a key projecting radially from the sleeve or stem and a longitudinal groove receiving the key in the other of the sleeve or stem.

8. The rotary valve of claim 2, including an adapter plate adjacent the housing and movable parallel to the shaft axis, and wherein the rotor and second end plate are supported by the adapter plate for displacement therewith between the operating and cleaning positions of the rotor.

9. The rotary valve of claim 8, including means operable between the adapter plate and the second end plate, for maintaining the rotor in coaxial alignment with the shaft as the rotor is displaced toward the shaft.

10. A method for cleaning a rotary valve of the type having a cylindrical housing defining a cylindrical valve chamber and a housing axis passing therethrough, opposed end plates connected to the housing for closing the axial ends of the housing, inlet and outlet openings through the walls of the housing into the chamber, a shaft disposed axially in the chamber, a vane rotor driven through a connection to the shaft for rotation within the chamber, and drive means located outside the housing and connected to the shaft adjacent to one of the end plates for rotating the shaft about the housing axis, wherein the method comprises the steps of:
    disconnecting and removing the other but not said one end plate from the housing;
    disconnecting the rotor from the shaft and removing the rotor from the housing;
    cleaning the rotor outside the housing while the shaft remains in the chamber and connected to the drive means;
    radially and axially aligning and reconnecting the cleaned rotor to the shaft within the housing; and
    reconnecting said other end plate to the housing.

11. The method of claim 10, wherein the steps of disconnecting and removing the other end plate and the rotor include the step of simultaneously removing the other end plate and rotor from the housing.

12. The method of claim 10, wherein the step of disconnecting the rotor from the shaft includes disconnecting a clamp which passes axially through the rotor into engagement with the shaft.

13. The method of claim 11 wherein the step of simultaneously removing includes pulling the other end plate and rotor axially from the housing while the end plate and rotor are rigidly connected to a common adapter member which is movable in parallel with the shaft axis.

* * * * *